July 5, 1960
J. H. GOULET ET AL
2,943,422
VALVE LAPPING MACHINE
Filed Dec. 29, 1958
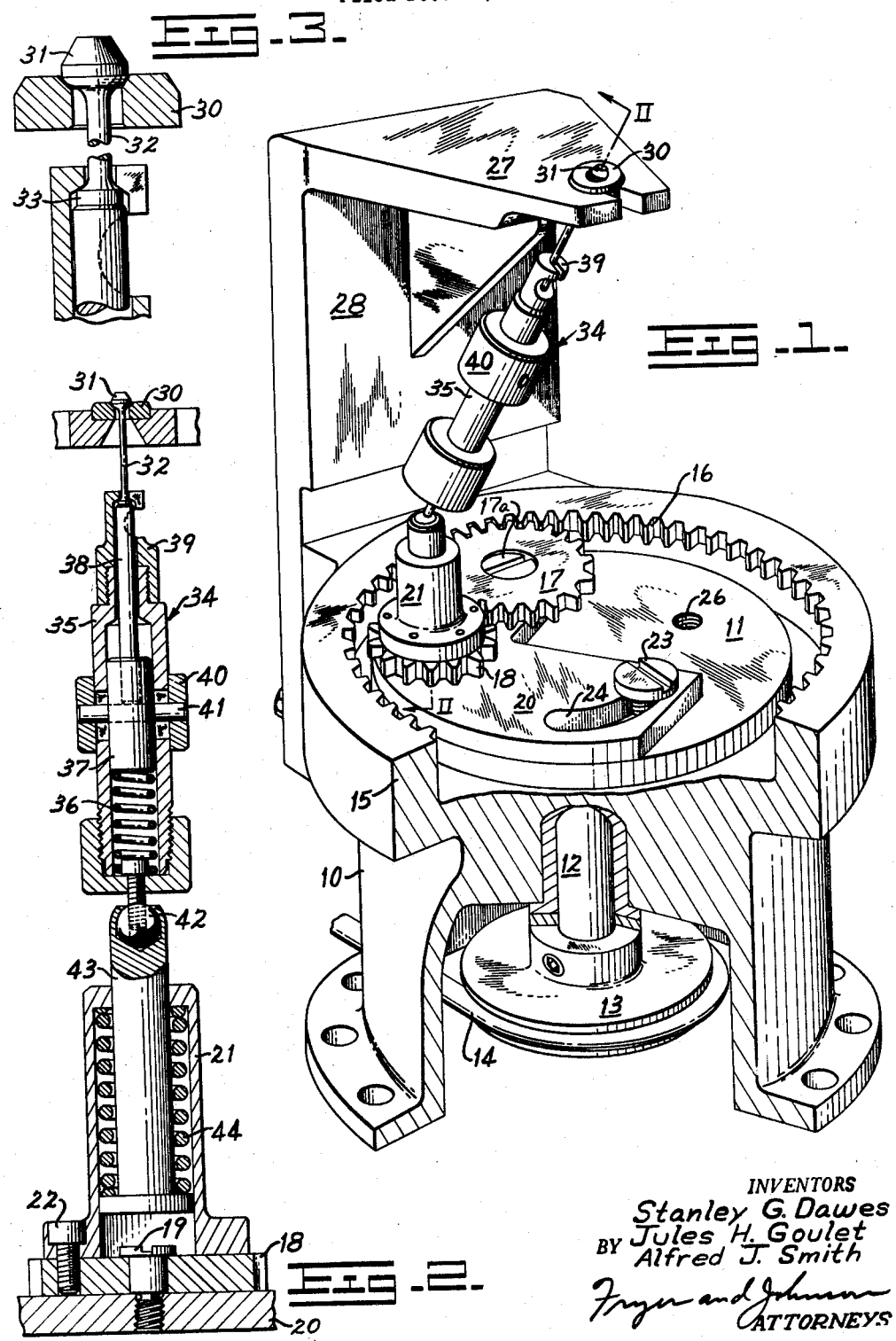
INVENTORS
Stanley G. Dawes
Jules H. Goulet
Alfred J. Smith
BY
Fryer and Johnson
ATTORNEYS

United States Patent Office 2,943,422
Patented July 5, 1960

2,943,422

VALVE LAPPING MACHINE

Jules H. Goulet, San Lorenzo, Stanley G. Dawes, Oakland, and Alfred J. Smith, San Leandro, Calif., assignors to Caterpillar Tractor Co., Peoria, Ill., a corporation of California Filed Dec. 29, 1958, Ser. No. 783,214

2 Claims. (Cl. 51—27)

This invention relates to a machine for producing mating lapped surfaces to form a perfect seal between such mechanical elements as a valve member and a seat against which it closes and particularly to a machine for forming a so-called spherical lap.

In some types of poppet valves, such for example as the fuel injection valves used in diesel engines, spherical seating surfaces are desirable to provide a large area of contact between the seating parts and to insure a seal in the event of slight misalignment of the valve with respect to its seat. Such a seat may be lapped by rotating one or both of the parts in mating contact while one of the parts follows a circular path angularly related to the common axis of both parts.

It is an object of the present invention to provide a machine for lapping valves or the like which, through very simple mechanism, imparts all necessary motion for the production of a spherical lap to one part while the other is stationary.

A further object of the invention is the provision of a machine to rotate a valve element on its own axis and at the same time to cause it to revolve in a path angularly related to the normal position of its axis with respect to a valve seat.

Further and more specific objects and advantages of the invention are made apparent in the following specification wherein a preferred form of the invention is described in detail by reference to the accompanying drawing.

In the drawing:

Fig. 1 is a perspective view with parts broken away of a valve lapping machine embodying the present invention;

Fig. 2 is a central longitudinal sectional view taken through the valve elements and the rotating and revolving mechanism illustrated in Fig. 1; and Fig. 3 is an enlarged view partially in section of the valve elements and a part of the holding member for one of the elements shown in Fig. 2.

Referring first to Fig. 1 of the drawing, the machine of the present invention is shown as comprising a main body member of generally cylindrical form indicated at 10 adapted to be secured to a table or other foundation and supporting a turntable 11 at the upper end of a shaft 12 to the lower end of which is secured a sheave 13. Power from a suitable source is transmitted to the sheave 13 through a belt such as indicated at 14 to effect rotation of the table 11. The housing includes an upstanding flange 15 machined to present an internally toothed ring gear 16 concentric with the table 11. A gear 17 mounted for rotation about the center of a pin 17a meshes with the ring gear 16 and also meshes with a gear 18, see also Fig. 2, which is mounted for rotation about a pin 19 carried by a plate 20.

With the construction thus far described, rotation of the turntable 11 imparts rotation to the gear 18 about its own axis and to a work driving member 21 which is secured to the gear 18 as by cap screws 22 for rotation therewith.

Rotation of the turntable also carries the gear 18 and work driver 21 with it so that they revolve about the center of the table 11 describing a circle the diameter of which is adjustable through movement of the plate 20. The plate 20 is pivotally supported by the same pin 17a which forms the center of rotation of the gear 17 and it is normally held against adjustment by a screw 23 extending through an arcuate slot 24 in the plate and securing the plate with relation to the table 11. In Fig. 1 the gear 18 is shown in its outermost position with respect to the table 11. However, upon removing the screw 23 and swinging the plate 20 in a counter-clockwise direction the gear 18 will move toward the center of the table 11 until, with the slot 24 over a second threaded hole 26 in the table for reception of the screw 23, the gear 18 may be brought to a central position coaxial with the table so that it will not describe a circle as it rotates upon its own axis. Any position of adjustment of the gear 18 may be obtained through the mechanism described between such a central position and the outermost position illustrated in Fig. 1.

A work supporting plate 27 extends over the turntable 11 from a bracket 28 secured to and extending upwardly from the housing 10. The work supporting plate 27 is recessed to receive an annular seat illustrated at 30, see also Figs. 2 and 3, which is the seat of the valve assembly to be lapped. The recess in the seat is coaxial with the turntable to hold the seat in a position centered with respect to the table. The valve element to be lapped against the seat is shown at 31 as having a stem 32 and an enlarged end 33 on the stem which in assembly of this particular valve serves as a spring seat.

A work holder generally indicated at 34 is shown as having a main cylinder 35 with a spring 36 therein urging a plunger 37 upwardly. The plunger carries a rod 38 which extends through the upper end of the cylinder and terminates in a chuck 39. The chuck 39 has a slotted open end for the reception of the valve stem 32 and the spring 36 urges the rod 38 upwardly to engage the enlarged head 33 on the valve stem to retain it in place in the chuck. Retraction of the rod 38 is enabled by a sliding hand ring 40 on the cylinder 34 which is connected as by a pin 41 to the piston 37. The lower end of the cylinder 35 is connected as by a ball and socket joint illustrated at 42 with a plunger 43 which is vertically reciprocable in the cylindrical work driving member 21 and urged downwardly therein by a spring 44. The purpose of the spring 44 is to exert downward pressure of the valve element 31 against the seat 30.

With all the parts in the position illustrated in Fig. 1 and a small quantity of lapping compound between the valve element 31 and seat 30, operation of the machine rotates the valve element about its own axis and simultaneously swings it about a circle which is concentric to the normal axis of the valve element with respect to its seat, thus accomplishing the desired spherical lapped surface between the valve element and its seat.

We claim:

1. A machine to lap complementary spherical portions of two valve elements comprising a turntable, an internally toothed ring gear concentric to said table, a gear on the table meshing with the ring gear, a second gear on the table meshing with the first gear, a work holder carried by said second gear to support one valve element, a support for the other valve element disposed in axial alignment with and spaced from the table, and means to rotate the table whereby the second gear and work holder will be rotated and revolved simultaneously with the valve elements contacting each other, said second gear being mounted for adjustment about the axis of the other gear on the table and for movement toward and away from the center of the table.

2. A machine to lap complementary spherical portions of two valve elements comprising a turntable, an internally toothed ring gear concentric to said table, a gear on the table meshing with the ring gear, a second gear on the table meshing with the first gear, a work holder carried by said second gear to support one valve element, a support for the other valve element disposed in axial alignment with and spaced from the table, and means to rotate the table whereby the second gear and work holder will be rotated and revolved simultaneously with the valve elements contacting each other, a plate supporting said second gear for rotation and resting on the table, a pivotal connection between said plate and the table coaxial with the center of rotation of the first gear whereby the plate may be adjusted to vary the orbit in which the second gear revolves with the gears remaining in mesh, and means to secure the plate in its position of adjustment with respect to the table.

References Cited in the file of this patent

UNITED STATES PATENTS

| | | |
|---|---|---|
| 1,635,469 | Ericsson | July 12, 1927 |
| 1,950,785 | Capps | Mar. 13, 1934 |